United States Patent
Kim et al.

(10) Patent No.: US 10,976,997 B2
(45) Date of Patent: Apr. 13, 2021

(54) ELECTRONIC DEVICE OUTPUTTING HINTS IN AN OFFLINE STATE FOR PROVIDING SERVICE ACCORDING TO USER CONTEXT

(71) Applicant: SAMSUNG ELECTRONICS CO., LTD., Suwon-si (KR)

(72) Inventors: Kyu Young Kim, Hwaseong-si (KR); Tae Kwang Um, Suwon-si (KR); Jae Yung Yeo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/043,511

(22) Filed: Jul. 24, 2018

(65) Prior Publication Data
US 2019/0026074 A1    Jan. 24, 2019

(30) Foreign Application Priority Data
Jul. 24, 2017   (KR) .................. 10-2017-0093424

(51) Int. Cl.
G06F 3/0488    (2013.01)
G06F 3/16      (2006.01)
G06F 3/041     (2006.01)
G10L 15/22     (2006.01)

(52) U.S. Cl.
CPC .............. *G06F 3/167* (2013.01); *G06F 3/041* (2013.01); *G06F 3/0488* (2013.01); *G10L 15/22* (2013.01)

(58) Field of Classification Search
CPC ........ G06F 3/167; G06F 3/0488; G06F 3/041; G10L 15/22
See application file for complete search history.

(56) References Cited

U.S. PATENT DOCUMENTS

| | | | |
|---|---|---|---|
| 2011/0313768 A1* | 12/2011 | Klein | G06F 3/038 704/251 |
| 2012/0265528 A1 | 10/2012 | Gruber et al. | |
| 2015/0254058 A1 | 9/2015 | Klein et al. | |
| 2016/0118048 A1* | 4/2016 | Heide | G10L 15/22 704/275 |
| 2017/0097618 A1* | 4/2017 | Cipollo | H04Q 9/00 |

FOREIGN PATENT DOCUMENTS

WO    00/67223    11/2000

OTHER PUBLICATIONS

"The Google Android App Now Supports Limited Voice Commands for Offline Use" (published by Cody Toombs on Sep. 28, 2015) https://www.androidpolice.com/2015/09/28/the-google-android-app-now-supports-limited-voice-commands-for-offline-use/.*
"Update to Google Docs, Sheets, Slides lets them automatically save recent files offline" (published by Derek Walter on May 24, 2016) https://www.greenbot.com/article/3074324/update-to-google-docs-sheets-slides-lets-them-automatically-save-recent-files-offline.html.*

* cited by examiner

*Primary Examiner* — Rinna Yi
(74) *Attorney, Agent, or Firm* — Nixon & Vanderhye P.C.

(57) ABSTRACT

An electronic device includes a housing, a touch screen display exposed through a first area of the housing, a microphone exposed through a second area of the housing, a wireless communication circuit, a processor electrically connected to the touch screen display, the microphone, and the wireless communication circuit, and a memory electrically connected to the processor and storing instructions.

14 Claims, 13 Drawing Sheets

ELECTRONIC DEVICE OUTPUTTING HINTS IN AN OFFLINE STATE FOR PROVIDING SERVICE ACCORDING TO USER CONTEXT

CROSS-REFERENCE TO RELATED APPLICATION

This application is based on and claims priority under 35 U.S.C. § 119 to Korean Patent Application No. 10-2017-0093424, filed on Jul. 24, 2017, in the Korean Intellectual Property Office, the disclosure of which is incorporated by reference herein its entirety.

BACKGROUND

1. Field

The present disclosure relates to a method and an electronic device for generating natural language expression.

2. Description of Related Art

In addition to a conventional input scheme using a keyboard or a mouse, an electronic device has recently supported various input schemes such as a voice input and the like. For example, in a state where a speech recognition service is executed, an electronic device such as a smartphone or tablet may recognize the user's voice input. When the user's voice input is recognized, the electronic device may perform an operation corresponding to the voice input.

An electronic device may communicate with an external server to perform an operation. For example, the electronic device may transmit a voice input to the external server. The external server may change a voice input into text data and may generate information for performing the operation based on the text data. The generated information may be transmitted to the electronic device, and the electronic device may perform the operation based on the information.

The above information is presented as background information only to assist with an understanding of the present disclosure. No determination has been made, and no assertion is made, as to whether any of the above might be applicable as prior art with regard to the present disclosure.

SUMMARY

As described above, when an electronic device is capable of communicating with an external server, the electronic device may perform an operation corresponding to a voice input. That is, when the electronic device is not capable of communicating with the external server (e.g., in a state where the electronic device is in an offline state), the electronic device may not change the voice input into text data and may not generate information for performing the operation based on the text data. Accordingly, the electronic device may not perform the operation corresponding to the voice input, and thus the user may be inconvenient.

Aspects of the present disclosure are to address at least the above-mentioned problems and/or disadvantages and to provide at least the advantages described below. Accordingly, an aspect of the present disclosure is to provide a method of processing a user's voice input when an electronic device is in an offline state.

In accordance with an aspect of the present disclosure, an electronic device includes a housing, a touch screen display exposed through a first area of the housing, a microphone exposed through a second area of the housing, a wireless communication circuit, a processor electrically connected to the touch screen display, the microphone, and the wireless communication circuit, and a memory electrically connected to the processor and storing instructions. In a first state where the wireless communication circuit is capable of communicating with an external server, the instructions, when executed, are configured to cause the processor to launch a voice secretary application, to transmit a user utterance obtained through the microphone, to the external server through the wireless communication circuit, to receive a first task corresponding to the user utterance from the external server, to perform the first task by using at least one application, and, when the wireless communication circuit enters a second state where the communication with the external server is impossible, from the first state, to output at least one or more hints in the touch screen display, to obtain/receive a first user input to select a first hint among the at least one or more hints, and to perform a second task corresponding to the first hint in response to the first user input.

In accordance with another aspect of the present disclosure, a computer-readable recording medium stores instructions, when executed by an electronic device, causing the electronic device, in a first state where the wireless communication circuit is capable of communicating with an external server, to launch a voice secretary application, to transmit a user utterance obtained through the electronic device, to the external server, to receive a first task corresponding to the user utterance from the external server, to perform the first task by using at least one application, and, when the wireless communication circuit enters a second state where the communication with the external server is impossible, from the first state, to output at least one or more hints, to obtain/receive a first user input to select a first hint among the at least one or more hints, and to perform a second task corresponding to the first hint in response to the first user input.

In accordance with another aspect of the present disclosure, an electronic device includes a touch screen display, a microphone obtaining a user utterance, a wireless communication circuit communicating with an external server, a memory transmitting the user utterance to the external server through the wireless communication circuit, receiving a first task corresponding to the user utterance from the external server, and storing a voice secretary application performing the received first task, in a first state where the wireless communication circuit is capable of communicating with the external server; and a processor electrically connected to the touch screen display, the microphone, the wireless communication circuit, and the memory. When the wireless communication circuit enters a second state, where the communication with the external server is impossible, from the first state, the processor is configured to launch the voice secretary application, to output at least one or more hints in the touch screen display, to obtain/receive a first user input to select a first hint among the at least one or more hints, and to perform a second task corresponding to the first hint in response to the first user input.

In accordance with another aspect of the present disclosure, an electronic device includes a housing, a touch screen display exposed through a first area of the housing and disposed inside the housing, a microphone exposed through a second area of the housing and disposed inside the housing, at least one speaker exposed through a third area of the housing and disposed inside the housing, a wireless communication circuit disposed inside the housing, a processor electrically connected to the touch screen display, the microphone, the speaker, and the wireless communication circuit and disposed inside the housing, and a memory electrically connected to the processor and disposed inside the housing. The memory is configured to store a plurality of application programs installed in the electronic device, and the memory stores instructions that, when executed, are configured to cause the processor to receive a first user input for calling an intelligent assistance service, through the touch screen display or the microphone, to determine whether the electronic device is communicating with an external server providing at least part of one operation of the intelligent assistance service, and, when the electronic device does not communicate with the external server, to provide at least one task, which is executable without the external server, through the touch screen display or the at least one speaker, to receive a second user input to select one of the at least one task, to select a sequence of states of the electronic device for performing the selected task, and to perform the selected task by causing the electronic device to have the sequence of the states.

According to various example embodiments of the present disclosure, when an electronic device is not capable of communicating with an external server, the electronic device may provide a user with a hint, and thus may perform a specified operation.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Prior to describing an example embodiment of the present disclosure, an integrated intelligent system to which an example embodiment of the present disclosure is capable of being applied will be described.

Figure 1:
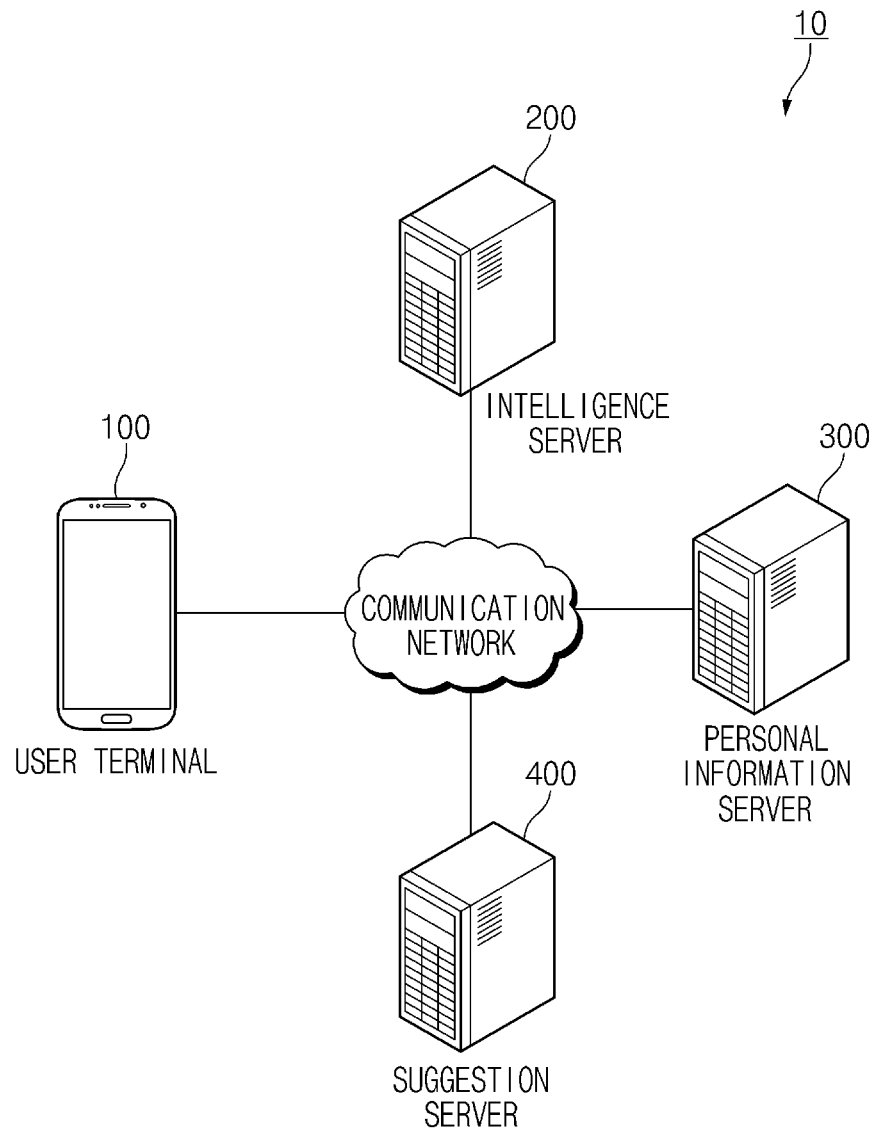
FIG. 1 is a view illustrating an integrated intelligent system, according to various example embodiments of the present disclosure.

FIG. 1 is a view illustrating an integrated intelligent system, according to various example embodiments of the present disclosure.

Referring to FIG. 1, an integrated intelligent system 10 may include a user terminal 100, an intelligence server 200, a personal information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. The user terminal 100 may receive a user input for launching the other app or for executing the operation of the other app, through the intelligence app. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate a command for operating an app based on the user utterance. As such, the user terminal 100 may operate the app by using the command.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute the action included in the path rule in the selected app.

Generally, the term "path rule" of the present disclosure may indicate, but is not limited to, a sequence of states in which an electronic device performs the task requested by the user. In other words, the path rule may include information about the sequence of the states. For example, the task may be a certain action that the intelligence app is capable of providing. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may be used to receive the user information from the personal information server 300 over the communication network and to generate a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
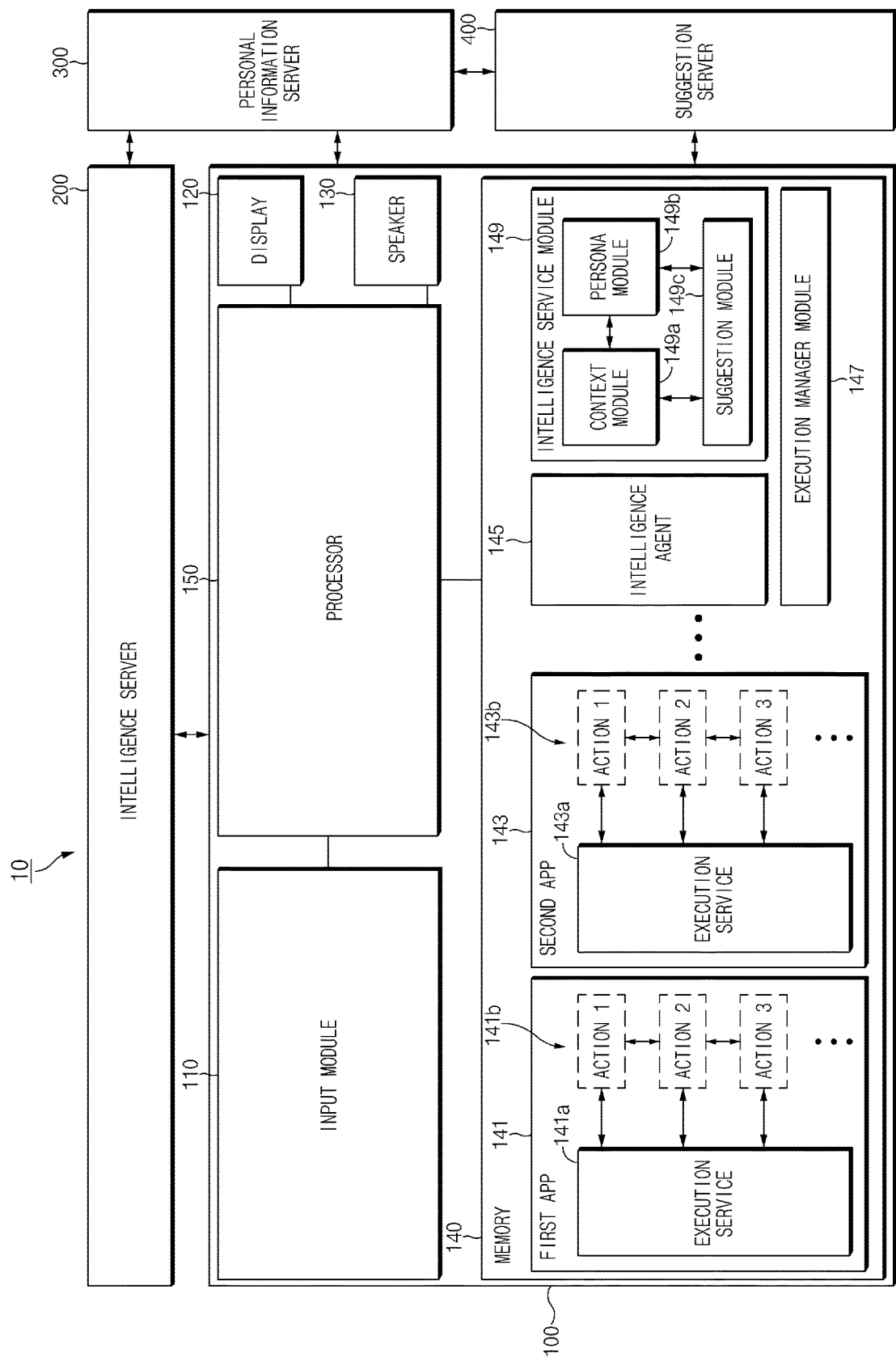
FIG. 2 is a block diagram illustrating a user terminal of an integrated intelligent system, according to an embodiment of the present disclosure.

FIG. 2 is a block diagram illustrating a user terminal of an integrated intelligent system, according to an embodiment of the present disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing. The user terminal 100 may further include a communication circuit positioned in the housing. The user terminal 100 may transmit or receive data (or information) to or from an external server (e.g., the intelligence server 200) through the communication circuit.

According to an embodiment, the input module 110 (including input circuitry) may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone that is capable of receiving the speech of the user as a sound signal. For example, the input module 110 may include a speech input system and may receive the speech of the user as a sound signal through the speech input system. For example, the microphone may be exposed through a part (e.g., a first portion) of the housing.

According to an embodiment, the display 120 may display an image, a video, and/or an execution screen of an application. For example, the display 120 may display a graphic user interface (GUI) of an app. According to an embodiment, the display 120 may be exposed to a part (e.g., a second part) of the housing.

According to an embodiment, the speaker 130 may output the sound signal. For example, the speaker 130 may output the voice signal generated in the user terminal 100 to the outside. According to an embodiment, the speaker 130 may be exposed to a part (e.g., a third part) of the housing.

According to an embodiment, the memory 140 may store a plurality of apps (or application program) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147 and the intelligence service module 149 may be a framework (or application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may operate after being launched. For example, the plurality of apps 141 and 143 stored in the memory 140 may operate after being launched by the execution manager module 147. The plurality of apps 141 and 143 may include execution service modules 141*a* and 143*a* performing a function. In an embodiment, the plurality of apps 141 and 143 may perform a plurality of actions (e.g., a sequence of states) 141*b* and 143*b* through execution service modules 141*a* and 143*a* for the purpose of performing a function. In other words, the execution service modules 141*a* and 143*a* may be activated by the execution manager module 147, and then may execute the plurality of actions 141*b* and 143*b*.

According to an embodiment, when the actions 141*b* and 143*b* of the apps 141 and 143 are executed, an execution state screen according to the execution of the actions 141*b* and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 147.

According to an embodiment, in the case where the plurality of the actions 141b and 143b are respectively executed in the apps 141 and 143, the plurality of the actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may transmit the execution request associated with the next action (e.g., action 2 of the first app 141 or action 2 of the second app 143) to the execution service modules 141a and 143a. According to an embodiment, in the case where the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 147 may transmit the execution request of the first action (e.g., action 1 of the second app 143) of the second app 143 to the execution service module 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touch screen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store necessary information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligence service module 149 to manage information of a user and may process a user input by using the information of the user.

The processor 150 may execute the intelligence agent 145 to transmit a user input received through the input module 110 to the intelligence server 200 and may process the user input through the intelligence server 200.

According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligence agent 145 may execute a wakeup recognition module stored in the memory 140 for the purpose of recognizing a call of a user. As such, the processor 150 may recognize the wakeup command of a user through the wakeup recognition module and may execute the intelligence agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. In the case where the intelligence agent 145 is executed, an intelligence app (e.g., a speech recognition app) operating in conjunction with the intelligence agent 145 may be executed.

According to an embodiment, the intelligence agent 145 may include a speech recognition module for performing the user input. The processor 150 may recognize the user input for executing an action in an app through the speech recognition module. For example, the processor 150 may recognize a limited user (voice) input (e.g., an utterance such as "click" for performing a capture operation when a camera app is being executed) for performing an action such as the wakeup command in the apps 141 and 143 through the speech recognition module. For example, the processor 150 may assist the intelligence server 200 to recognize and rapidly process a user command capable of being processed in the user terminal 100 through the speech recognition module. According to an embodiment, the speech recognition module of the intelligence agent 145 for executing a user input may be implemented in an app processor.

According to an embodiment, the speech recognition module (including the speech recognition module of a wake up module) of the intelligence agent 145 may recognize the user input by using an algorithm for recognizing a voice. For example, the algorithm for recognizing the voice may be at least one of a hidden Markov model (HAW) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may transmit the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may launch the apps 141 and 143. Also, the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147; and the processor 150 may receive completion information of the actions 141b and 143b from the apps 141 and 143.

According to an embodiment, the processor 150 may execute the execution manager module 147 to transmit the command information (e.g., path rule information) for executing the actions 141b and 143b of the apps 141 and 143 between the intelligence agent 145 and the apps 141 and 143. The processor 150 may bind the apps 141 and 143 to be executed depending on the path rule through the execution manager module 147 and may transmit the command information (e.g., path rule information) of the actions 141b and 143b included in the path rule to the apps 141 and 143. For example, the processor 150 may sequentially transmit the actions 141b and 143b included in the path rule to the apps 141 and 143, through the execution manager module 147 and may sequentially execute the actions 141b and 143b of the apps 141 and 143 depending on the path rule.

According to an embodiment, the processor 150 may execute the execution manager module 147 to manage execution states of the actions 141b and 143b of the apps 141 and 143. For example, the processor 150 may receive information about the execution states of the actions 141b and 143b from the apps 141 and 143, through the execution manager module 147. For example, in the case where the execution states of the actions 141b and 143b are in partial landing (e.g., in the case where a parameter necessary for the actions 141b and 143b are not input), the processor 150 may transmit information about the partial landing to the intelligence agent 145, through the execution manager module 147. The processor 150 may make a request for an input of necessary information (e.g., parameter information) to the user by using the received information through the intelligence agent 145. For another example, in the case where the execution state of each of the actions 141b and 143b is an operating state, the processor 150 may receive an utterance from the user through the intelligence agent 145.

The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may transmit the received parameter information to the execution manager module 147 through the intelligence agent 145. The execution manager module 147 may change a parameter of each of the actions 141b and 143b to a new parameter by using the received parameter information.

According to an embodiment, the processor 150 may execute the execution manager module 147 to transmit parameter information included in the path rule to the apps 141 and 143. In the case where the plurality of apps 141 and 143 are sequentially executed depending on the path rule, the execution manager module 147 may transmit the parameter information included in the path rule from one app to another app.

According to an embodiment, the processor 150 may execute the execution manager module 147 to receive a plurality of path rules. The processor 150 may select a plurality of path rules based on the utterance of the user, through the execution manager module 147. For example, in the case where the user utterance specifies one app 141 executing one action 141b but does not specify the other app 143 executing the other action 143b, the processor 150 may receive a plurality of different path rules, in which the same app 141 (e.g., gallery app) executing the one action 141b is executed and in which a different app 143 (e.g., message app or Telegram app) executing the other action 143b is executed, through the execution manager module 147. For example, the processor 150 may execute the same actions 141b and 143b (e.g., the same successive actions 141b and 143b) of the plurality of path rules, through the execution manager module 147. In the case where the execution manager module 147 executes the same action, the processor 150 may display a state screen for selecting the different apps 141 and 143 respectively included in the plurality of path rules in the display 120, through the execution manager module 147.

According to an embodiment, the intelligence service module 149 may include a context module 149a, the persona module 149b, or a suggestion module 149c.

The context module 149a may collect current states of the apps 141 and 143 from the apps 141 and 143. For example, the context module 149a may receive context information indicating the current states of the apps 141 and 143 to collect the current states of the apps 141 and 143.

The persona module 149b may manage personal information of the user utilizing the user terminal 100. For example, the persona module 149b may collect the usage information and the execution result of the user terminal 100 to manage personal information of the user.

The suggestion module 149c may predict the intent of the user to recommend an instruction to the user. For example, the suggestion module 149c may recommend an instruction to the user in consideration of the current state (e.g., a time, a place, a situation, or an app) of the user.

Figure 3:
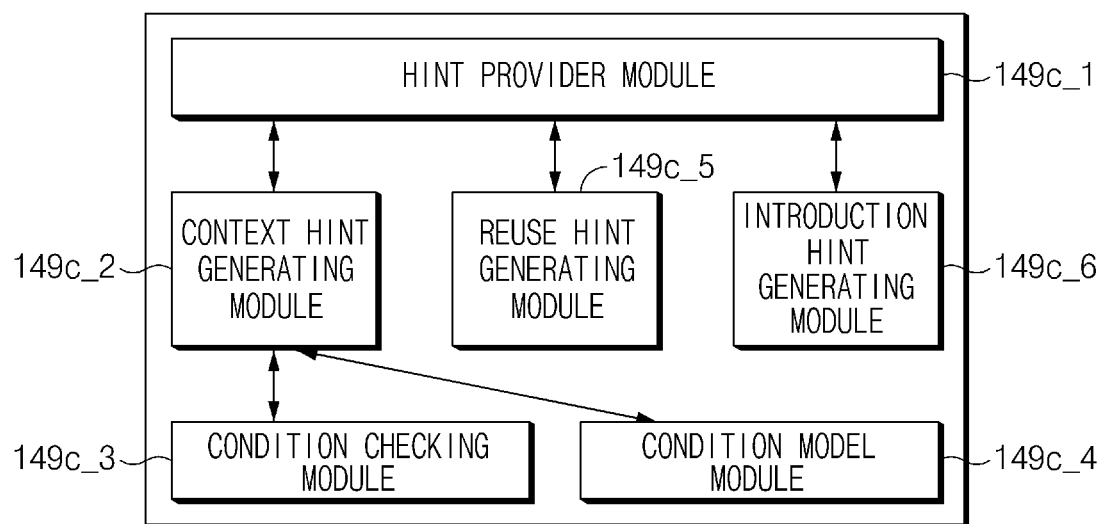
FIG. 3 is a block diagram illustrating a suggestion module of an intelligence service module, according to an embodiment of the present disclosure.

FIG. 3 is a block diagram illustrating a suggestion module of an intelligence service module, according to an embodiment of the present disclosure.

Referring to FIG. 3, the suggestion module 149c may include a hint provider module 149c_1, a context hint generating module 149c_2, a condition checking module 149c_3, a condition model module 149c_4, a reuse hint generating module 149c_5, or an introduction hint generating module 149c_6.

According to an embodiment, the processor 150 may execute the hint provider module 149c_1 to provide a user with a hint. For example, the processor 150 may receive the generated hint from the context hint generating module 149c_2, the reuse hint generating module 149c_5, or the introduction hint generating module 149c_6 through the hint provider module 149c_1, to provide the user with the hint.

According to an embodiment, the processor 150 may execute the condition checking module 149c_3 or the condition model module 149c_4 to generate a hint capable of being recommended depending on the current state. The processor 150 may execute the condition checking module 149c_3 to receive information corresponding to the current state from the intelligence service module 149, and may execute the condition model module 149c_4 to set a condition model by using the received information. For example, the processor 150 may execute the condition model module 149c_4 to grasp a time, a location, a situation, an app being executed, or the like at a point in time when the hint is provided to the user, and thus may provide the user with a hint, which is likely to be used under the corresponding condition, in descending order of priority.

According to an embodiment, the processor 150 may execute the reuse hint generating module 149c_5 to generate a hint capable of being recommended depending on the usage frequency. For example, the processor 150 may execute the reuse hint generating module 149c_5 to generate the hint based on a usage pattern of the user.

According to an embodiment, the introduction hint generating module 149c_6 may generate a hint for introducing a new function and a function, which is most frequently used by another user, to the user. For example, the hint for introducing the new function may include introduction (e.g., an operating method) associated with the intelligence agent 145.

According to another embodiment, the personal information server 300 may include the context hint generating module 149c_2, the condition checking module 149c_3, the condition model module 149c_4, the reuse hint generating module 149c_5, or the introduction hint generating module 149c_6 of the suggestion module 149c. For example, the processor 150 may receive the hint from the context hint generating module 149c_2, the reuse hint generating module 149c_5, or the introduction hint generating module 149c_6 of the personal information server 300 through the hint provider module 149c_1 of the suggestion module 149c to provide the user with the received hint.

According to an embodiment, the user terminal 100 may provide the hint depending on the following series of processes. For example, when receiving a hint providing request from the intelligence agent 145, the processor 150 may transmit the hint generating request to the context hint generating module 149c_2 through the hint provider module 149c_1. When receiving the hint generating request, the processor 150 may receive information corresponding to the current state from the context module 149a and the persona module 149b through the condition checking module 149c_3. The processor 150 may transmit the received information to the condition model module 149c_4 through the condition checking module 149c_3, and may assign a priority to a hint among hints to be provided to the user, in order of high availability under a condition by using the information through the condition model module 149c_4. The processor 150 may verify the condition through the context hint generating module 149c_2 and may generate a hint corresponding to the current state. The processor 150 may transmit the generated hint to the hint provider module 149c_1 through the context hint generating module 149c_2. The processor 150 may sort the hint depending on the specified rule through the hint provider module 149c_1 and may transmit the hint to the intelligence agent 145.

According to an embodiment, the processor 150 may generate a plurality of context hints through the hint provider module 149c_1 and may assign priorities to the plurality of context hints depending on the specified rule. According to an embodiment, the processor 150 may provide the user with a context hint, the priority of which is high, from among the plurality of context hints at first through the hint provider module 149c_1.

According to an embodiment, the user terminal 100 may propose a hint according to the use frequency. For example, when receiving a hint providing request from the intelligence agent 145, the processor 150 may transmit the hint generating request to the reuse hint generating module 149c_5 through the hint provider module 149c_1. When receiving the hint generating request, the processor 150 may receive user information from the persona module 149b through the reuse hint generating module 149c_5. For example, the processor 150 may receive a path rule included in preference information of the user of the persona module 149b, a parameter included in the path rule, an execution frequency of an app, and information about time and space in which the app is used, through the reuse hint generating module 149c_5. The processor 150 may generate a hint corresponding to the received user information, through the reuse hint generating module 149c_5. The processor 150 may transmit the generated hint to the executed hint provider module 149c_1 through the reuse hint generating module 149c_5. The processor 150 may sort the hint through the hint provider module 149c_1 and may transmit the hint to the executed intelligence agent 145.

According to an embodiment, the user terminal 100 may propose a hint associated with a new function. For example, when receiving a hint providing request from the executed intelligence agent 145, the processor 150 may transmit the hint generating request to the introduction hint generating module 149c_6 through the hint provider module 149c_1. The processor 150 may transmit an introduction hint providing request to the suggestion server 400 and may receive information about a function to be introduced from the suggestion server 400, through the introduction hint generating module 149c_6. For example, the suggestion server 400 may store the information about the function to be introduced, and a hint list associated with the function to be introduced may be updated by a service operator. The processor 150 may transmit the generated hint to the executed hint provider module 149c_1 through the introduction hint generating module 149c_6. The processor 150 may sort the hint through the hint provider module 149c_1 and may transmit the hint to the executed intelligence agent 145.

As such, the processor 150 may provide a user with a hint generated by the context hint generating module 149c_2, the reuse hint generating module 149c_5, or the introduction hint generating module 149c_6, through the suggestion module 149c. For example, the processor 150 may display the generated hint in an app operating the intelligence agent 145 through the suggestion module 149c and may receive an input for selecting the hint from the user through the app.

Figure 4:
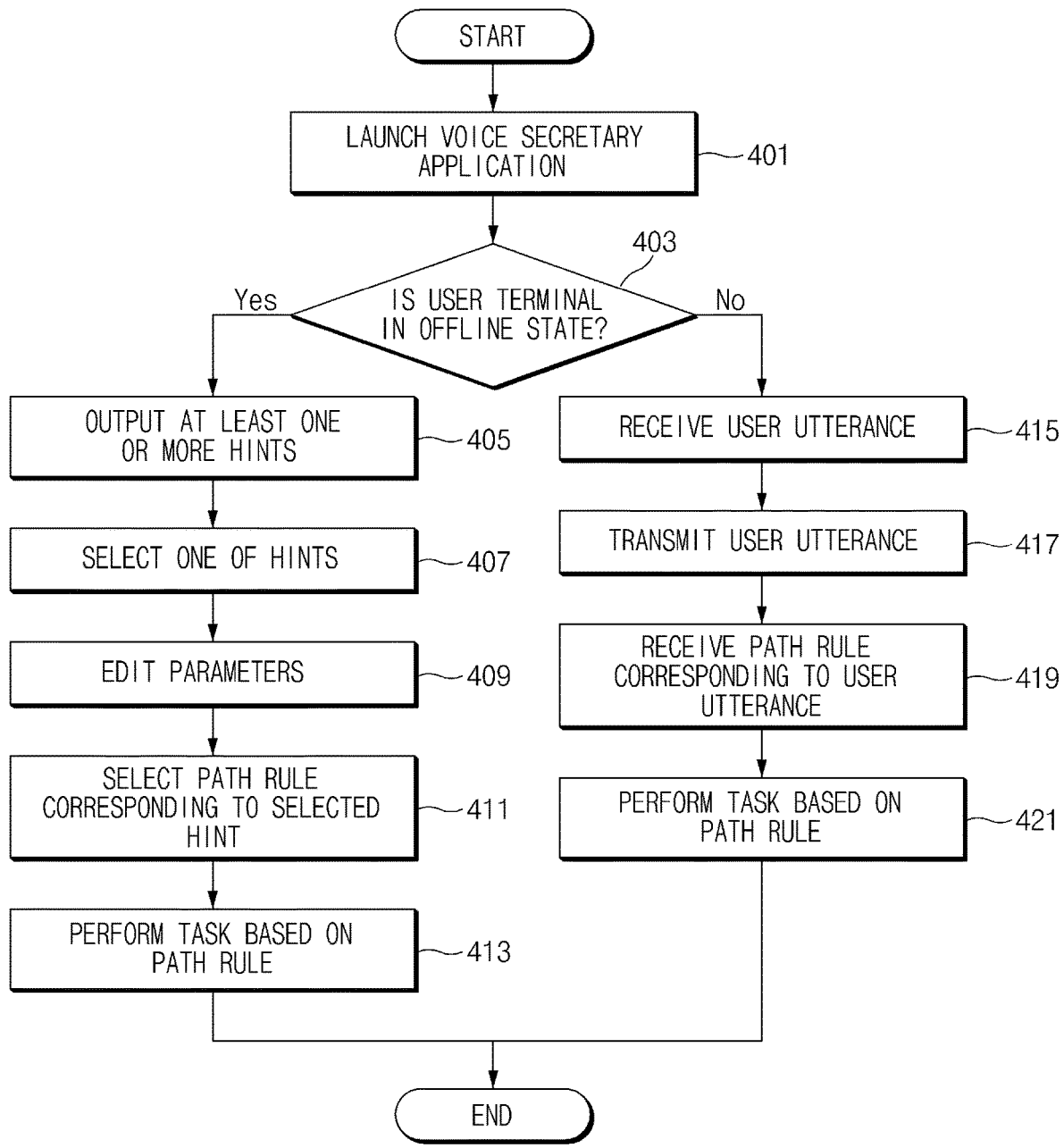
FIG. 4 illustrates an operation flowchart of a user terminal, according to an embodiment of the present disclosure.

FIG. 4 illustrates an operation flowchart of a user terminal, according to an embodiment of the present disclosure.

Referring to FIG. 4, in operation 401, the user terminal 100 (e.g., processor 150 of FIG. 2) may launch a voice secretary application (or intelligent assistance service). For example, the user terminal 100 may launch the voice secretary application based on a first user input for calling the voice secretary application. In the present disclosure, the voice secretary application may mean an application capable of recognizing a user's utterance and performing the task corresponding to the user's utterance.

If the voice secretary application is launched, in operation 403, the user terminal 100 (e.g., processor 150 of FIG. 2) may determine whether the user terminal 100 is in an offline state. In this disclosure, the offline state may mean a state where the user terminal 100 (or a wireless communication circuit included in the user terminal 100) is not capable of communicating with an external server (e.g., the intelligence server 200, the personal information server 300, or the suggestion server 400 of FIG. 1).

When the user terminal 100 enters an offline state, in operation 405, the user terminal 100 (e.g., processor 150 of FIG. 2) may output at least one or more hints among hints stored in the memory 140. For example, the user terminal 100 may output hints (e.g., "play music stored in a folder", or "show me the recent document"), which correspond to a task capable of being performed in the offline state, from among hints stored in the memory 140, through the display 120.

According to an embodiment, when the user terminal 100 enters the offline state, the user terminal 100 (e.g., the processor 150) may output a mark indicating that the user terminal 100 has entered the offline state, through the display 120. In addition, even though a user speaks in the offline state, the user terminal 100 may not perform a task corresponding to the utterance.

According to an embodiment, the user terminal 100 (e.g., the processor 150) may generate a hint list by listing at least one or more hints among the hints stored in the memory 140. For example, the user terminal 100 may generate a hint list by listing hints (e.g., "find connectable Wi-Fi networks around me" and "connect to LTE networks") for getting out of the offline state. The generated hint list may be output through the display 120.

In in operation 407, the user terminal 100 may obtain a second user input (e.g., touch the display 120) to select one of at least one or more hints. For example, when the user touches an area where a first hint is output among the first hint (e.g., "play music stored in a folder"), a second hint (e.g., "show me the recent document"), and a third hint (e.g., "show me today's schedule"), the user terminal 100 may recognize the touch.

In operation 409, the user terminal 100 (e.g., the processor 150) may edit parameters of the selected hint. Assuming that the first hint is selected in the embodiment, the user terminal 100 may edit "play music stored in a folder" as "play a video stored in a folder". Operation 409 may be skipped, and the detailed descriptions about operation 409 will be described below with reference to FIG. 7.

Operation 411, the user terminal 100 (e.g., the processor 150) may select a path rule corresponding to the selected hint. Assuming that the first hint is selected in the embodiment, the user terminal 100 may select a path rule corresponding to "play music stored in a folder". The path rule may be stored in the memory 140 together with hints.

In operation 413, the user terminal 100 (e.g., the processor 150) may perform a task based on the path rule. Assuming that the first hint is selected in the embodiment, the user terminal 100 may play the music stored in the folder, based on the path rule.

In the case where the determination result in operation 403 indicates that the user terminal 100 is not in the offline state (e.g., in the case where the user terminal 100 is in an online state), in operation 415, the user terminal 100 (e.g., the processor 150) may receive a user utterance. For example, when the user speaks, the user terminal 100 may receive the user utterance through a microphone.

In operation 417, the user terminal 100 may transmit the user utterance received through the microphone, to an external server. For example, when the user utters "how is the weather today?", the user terminal 100 may transmit the user utterance to the external server. The external server may be at least one of the intelligence server 200, the personal information server 300, and the suggestion server 400 shown in FIG. 1.

In operation 419, the user terminal 100 may receive a path rule corresponding to the user utterance from the external server. In the embodiment, the user terminal 100 may receive the path rule corresponding to "how is the weather today?".

In operation 421, the user terminal 100 may perform a task based on the received path rule. In the embodiment, the user terminal 100 may launch a weather application, or may search for weather through a browser to output information about the weather to a display.

Figure 5:
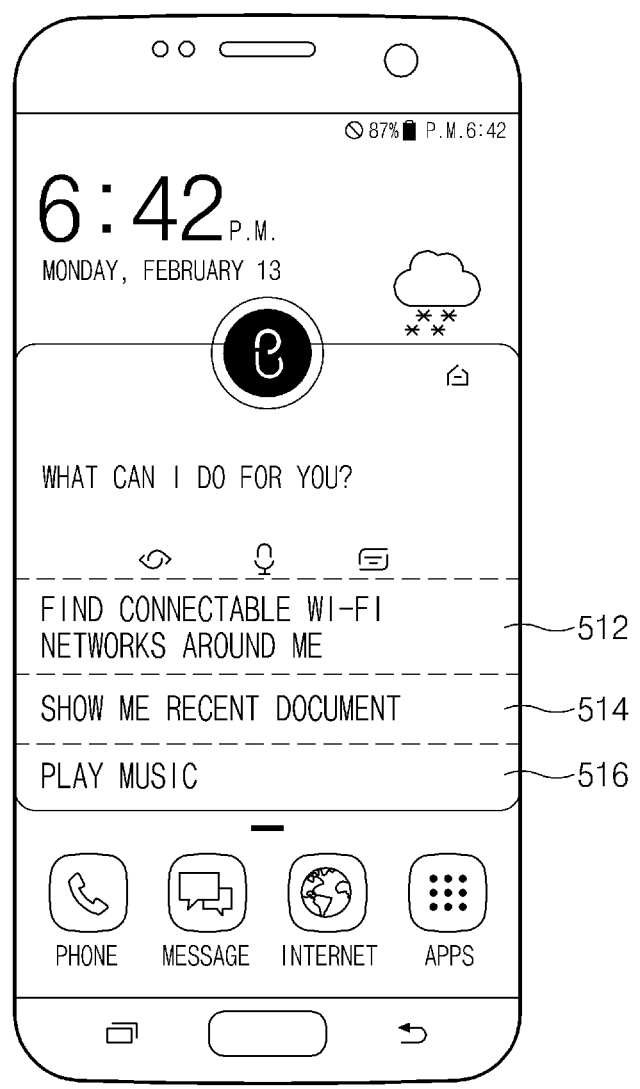
FIG. 5 illustrates a user terminal outputting hints in an offline state, according to an embodiment of the present disclosure.

FIG. 5 illustrates a user terminal outputting hints in an offline state, according to an embodiment of the present disclosure.

Referring to FIG. 5, the user terminal 100 may output at least one hint in the offline state. The number of hints capable of being output by the user terminal 100 is not particularly limited, and for example, the user terminal 100 may output a first hint 512, a second hint 514, and a third hint 516 as shown in FIG. 5. The shapes and content of hints 512, 514, and 516 may be different from those illustrated in FIG. 5.

According to an embodiment, the user terminal 100 may output hints corresponding to an application being executed. For example, a message application, a schedule application, and a video playing application may be launched in the offline state. In this case, the user terminal 100 may output "show the recently received message", "show today's schedule", and "show images captured yesterday" as the first hint 512, the second hint 514, and the third hint 516, respectively.

According to an embodiment, the user terminal 100 may output hints based on user context. The user context may be data obtained through the user terminal 100 (e.g., a hint frequently selected by a user or an application frequently used by a user). For example, the number of times that the subway line application has been executed may be 50 times; the number of times that the image edit application has been executed may be 40 times, the number of times that the camera application has been executed may be 30 times; the number of times that the schedule application has been executed may be 20 times; and the number of times the message application has been executed may be 10 times. In this case, the user terminal 100 may output "show me the subway line", "change the color of the recently captured image", and "take a picture" as the first hint 512, the second hint 514, and the third hint 516, respectively.

According to an embodiment, the user terminal 100 may output hints based on the version of an application in the offline state. For example, the version of the message application may be updated from 3.1.1 to 3.1.2. As the version is refined, a function to transmit the video to another user terminal may be added to a message application. In this case, the user terminal 100 may output "send the recently captured video to Mom" as a hint.

According to an embodiment, the user terminal 100 may output hints corresponding to the tasks capable of being performed in the online state. For example, the user terminal 100 may output "upload to the recent picture onto the cloud", "show the recently received mail", and "search for whether it rains tomorrow" as the first hint 512, the second hint 514, and the third hint 516 in the "offline" state, respectively. When the first to third hints 512 to 516 are output, the user may select one of the first to third hints 512 to 516.

When the state of the user terminal 100 is changed from the offline state to the online state, the user terminal 100 may perform a task corresponding to the selected hint. In the above-described exemplification, when the user selects the third hint 516 and then the state of the user terminal 100 is changed from the offline state to the online state, the user terminal 100 may search for whether it rains tomorrow, through the web browser. In another embodiment, the user terminal 100 may also search for whether it rains tomorrow, through the weather application.

According to an embodiment, after receiving the user utterance, the user terminal 100 may change the user utterance into text data. The user terminal 100 may generate a path rule based on the text data. When the path rule is generated, the user terminal 100 may perform the task based on the generated path rule. For example, when a user utters "how is the weather today?", the user terminal 100 may change the user utterance into the text data and may generate a path rule based on the text data. The user terminal 100 may launch a weather application based on a generated path rule or may search for the weather through a browser.

According to an embodiment, a table in which the user utterance and hints are matched with each other may be stored in the memory 140. In this case, when the user utterance is entered, the user terminal 100 may output hints matched with the user utterance. For example, when the user utters "send the picture", "send the recent picture to Mom via a message", "upload my pictures to the cloud.", "send pictures of Hawaii to my little brother/sister" may be matched and stored in the memory 140. At this time, when the user utters "send the picture.", the user terminal 100 may output the hints via the display 120.

Figure 6:
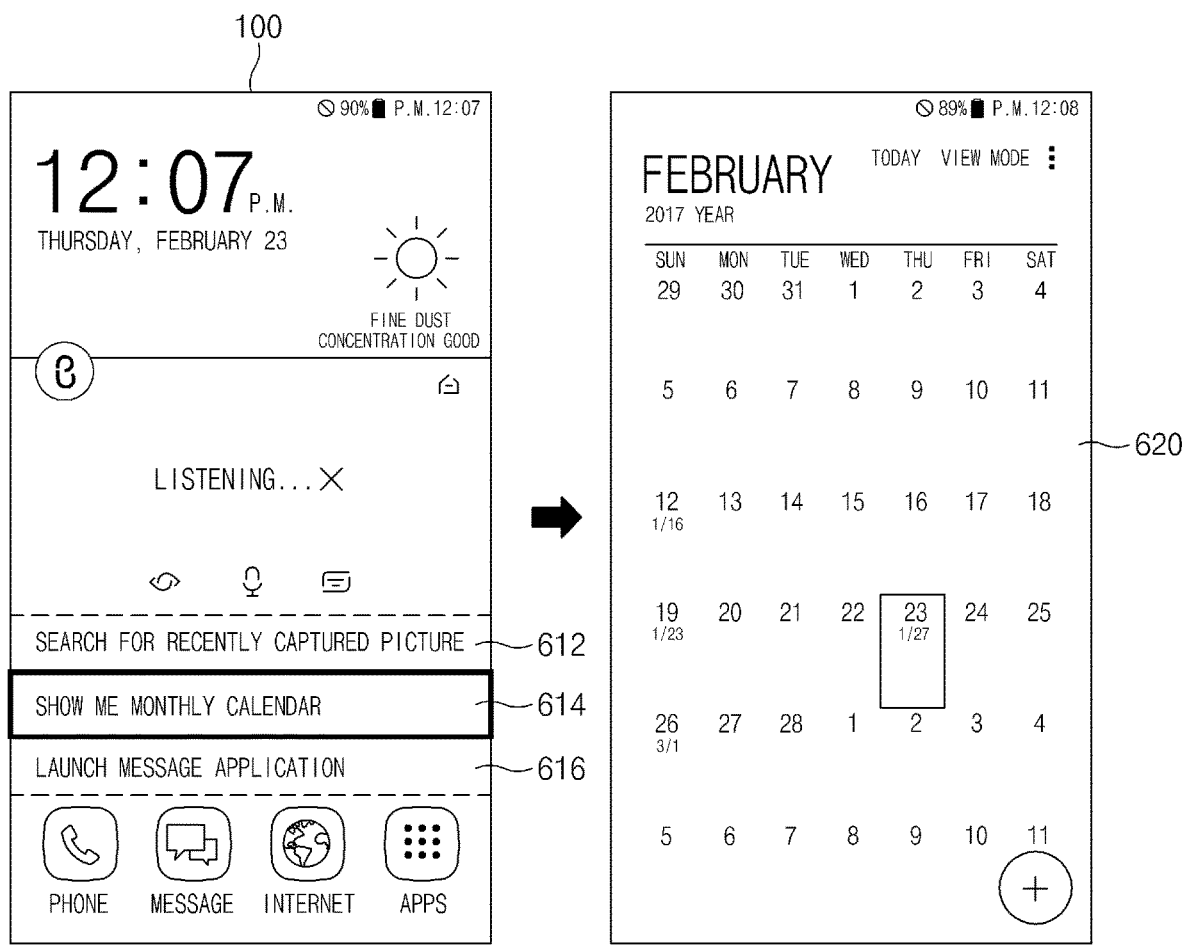
FIG. 6 illustrates a user terminal performing a task based on a user input, according to an embodiment of the present disclosure.

FIG. 6 illustrates a user terminal performing a task based on a user input, according to an embodiment of the present disclosure.

Referring to FIG. 6, the user terminal 100 may perform a task corresponding to the selected hint based on a user input to select one of the hints. For example, as illustrated in FIG. 6, when a user selects a second hint 614 among a first hint 612 ("search for the recently captured picture"), the second hint 614 ("show me the monthly calendar"), and a third hint 616 ("launch a message application"), the user terminal 100 may launch a calendar application 620. Although not illustrated in FIG. 6, when the user selects the first hint 612, the user terminal 100 may search for and output the recently captured picture among pictures stored in the image folder.

According to various example embodiments of the present disclosure, the user may select a plurality of hints, and the user terminal 100 may perform tasks corresponding to selected hints. For example, when the user selects the second hint 614 after selecting the first hint 612, the user terminal 100 may execute the calendar application 620 after outputting the found picture. For another example, the user terminal 100 may split the screen to output the found picture and the calendar application 620 at the same time.

Figure 7:
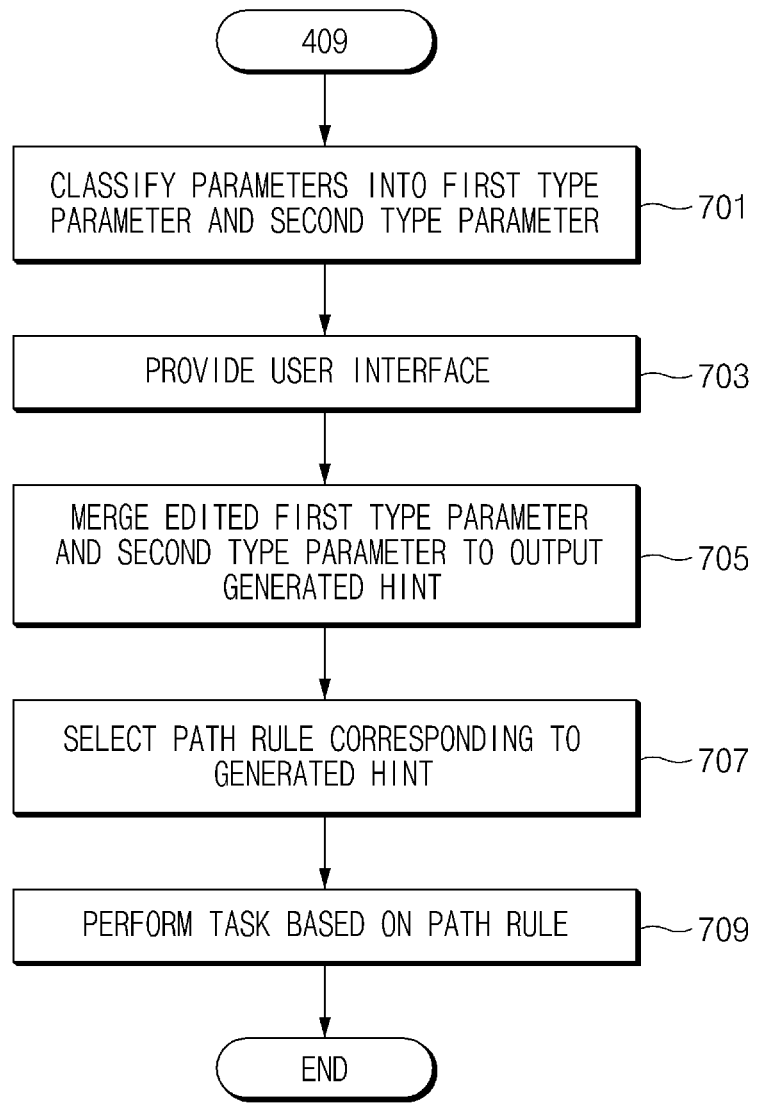
FIG. 7 illustrates an operation flowchart of a user terminal, according to another embodiment of the present disclosure.

FIG. 7 illustrates an operation flowchart of a user terminal, according to another embodiment of the present disclosure. The operations illustrated in FIG. 7 may be operations performed in a user terminal after operation 405 illustrated in FIG. 4 is performed.

Referring to FIG. 7, in operation 701, the user terminal 100 (e.g., the processor 150) may classify parameters, which are included in the hint selected by a user, into a first type parameter and a second type parameter. The first type parameter may refer to a parameter, which is capable of being edited by a user, from among parameters belonging to the hint. The second type parameter may refer to a parameter, which is not capable of being edited by a user, from among parameters belonging to the hint. For example, since "today" and "something to buy at a mart" are editable in a hint saying that "show me something to buy at a mart today", "today", and "something to buy at a mart" may be classified as the first type parameter. On the other hand, since "show" is not editable, "show" may be classified as the second type parameter.

In operation 703, the user terminal 100 (e.g., the processor 150) may provide the user with a user interface capable of editing the first type parameter. When the user interface is output through a display, the user may edit the first type parameter through the user interface. In the embodiment, a user may edit "today" to "yesterday" and may edit "something to buy at a mart" to "something bought at a pharmacy". The user may directly edit the first type parameter through an on-screen keyboard or may edit the first type parameter in a method of selecting one in a parameter list. The parameter list may mean a list of a plurality of parameters.

In operation 705, the user terminal 100 (e.g., the processor 150) may generate a new hint by merging the edited first type parameter and the second type parameter. The generated hint may be output through the display. In the embodiment, the user terminal 100 may generate "show something bought at a pharmacy yesterday" by merging "yesterday", "something bought at a pharmacy", and "show".

In operation 707, the user terminal 100 (e.g., the processor 150) may select a path rule corresponding to the generated hint. In the embodiment, the user terminal may select a path rule corresponding to "show me something bought at a pharmacy yesterday".

In operation 709, the user terminal 100 (e.g., the processor 150) may perform a task based on the selected path rule. For example, in the embodiment, the user terminal 100 may launch a housekeeping book application to display a list of drugs that the user bought at a pharmacy yesterday.

Figure 8:
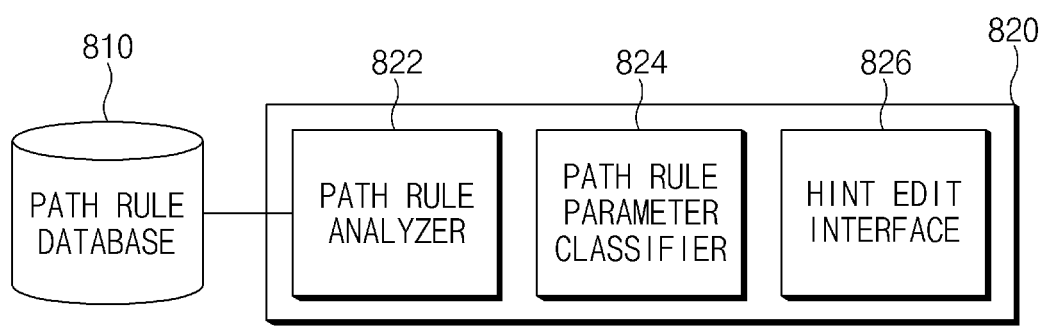
FIG. 8 illustrates a path rule database and a parameter processing unit, according to an embodiment of the present disclosure.

FIG. 8 illustrates a path rule database and a parameter processing unit, according to an embodiment of the present disclosure.

Referring to FIG. 8, the user terminal 100 may include a path rule database 810 and a parameter processing unit 820. The parameter processing unit 820 may include a path rule analyzer 822, a path rule parameter classifier 824, and a hint edit interface 826. The path rule database 810 and the parameter processing unit 820 may be implemented with hardware or software. It is understood that the operation performed by the parameter processing unit 820 is an operation performed by the processor 150.

The path rule database 810 may store at least one or more hints and a path rule corresponding to a hint.

The path rule analyzer 822 may receive the hints and the path rule from the path rule database 810. The path rule analyzer 822 may classify parameters, which are included in hints, into the first type parameter capable of being edited and the second type parameter not capable of being edited. For example, the path rule analyzer 822 may classify "yesterday" and "the captured picture" as the first type parameter and may classify "find" as a second type parameter, in the hint saying that "find a picture taken yesterday".

The path rule parameter classifier 824 may classify attributes of parameters. In the embodiment, the path rule parameter classifier 824 may classify "yesterday" as a parameter associated with a schedule, and may classify "the captured picture" as a parameter associated with an image.

The hint edit interface 826 may provide the user with an environment capable of editing a hint. For example, the hint edit interface 826 may provide an interface capable of editing the corresponding parameter depending on the attribute of a parameter. In the embodiment, since "yesterday" has the attribute associated with the schedule, the hint edit interface 826 may provide an interface capable of selecting the date. Since "the captured picture" has the attribute associated with an image, the hint edit interface 826 may provide an interface for selecting a picture or video. For another example, for the purpose of preventing the user from editing the parameter of "find", the hint edit interface 826 may not provide an interface associated with the parameter.

Figure 9:
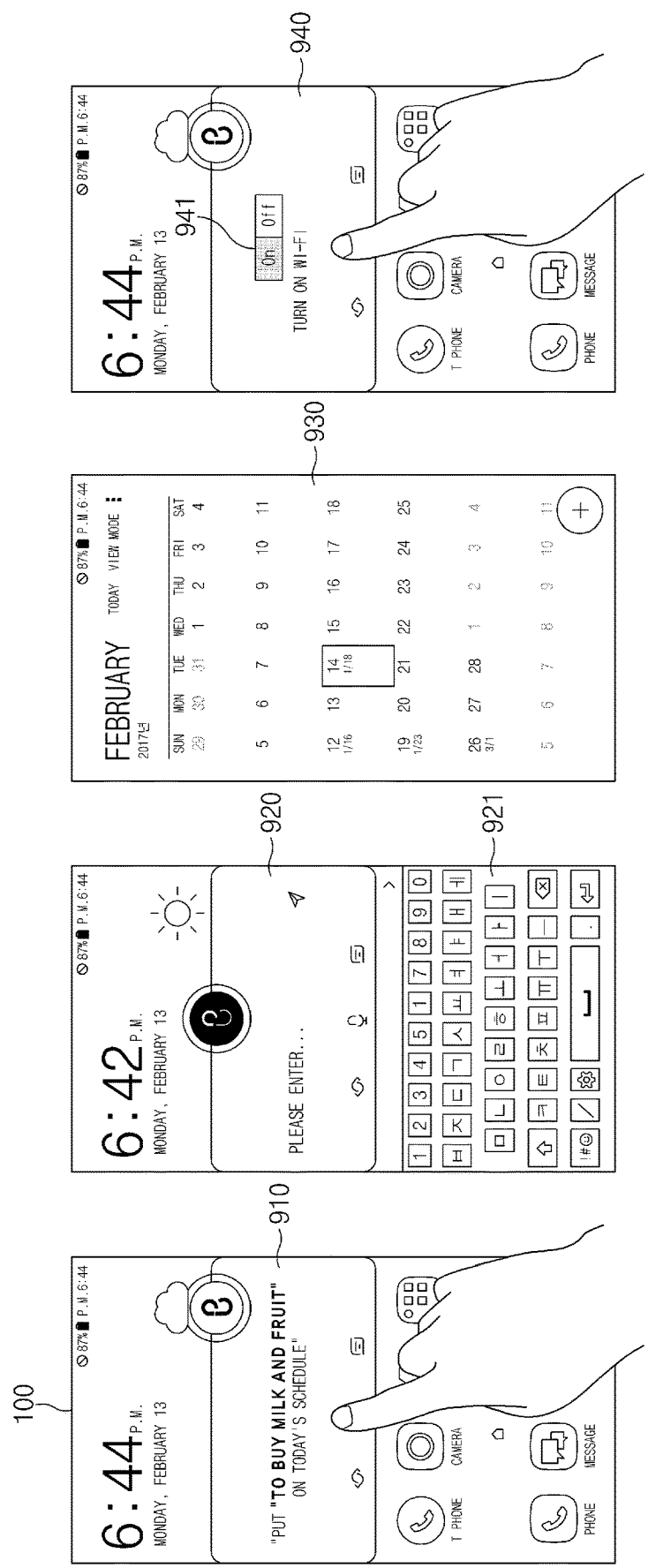
FIG. 9 illustrates a user interface, according to an embodiment of the present disclosure.

FIG. 9 illustrates a user interface, according to an embodiment of the present disclosure.

Referring to FIG. 9, the user terminal 100 may classify and output parameters as editable parameters and non-editable parameters, through a first interface 910. In the exemplification of FIG. 9, since "to buy milk and fruit" and "today" are editable, and "put it on schedule" is non-editable, the user terminal 100 may display "to buy milk and fruit" and "today", and "put it on schedule" in the display so as to have different colors. For another example, the user terminal 100 may display "to buy milk and fruit" and "today", and "put it on schedule" in a display so as to have different sizes.

The user terminal 100 may edit a parameter through a second interface 920. In the embodiment, for the purpose of editing "to buy milk and fruit", the user terminal 100 may provide the second interface 920. The second interface 920 may include an on-screen keyboard 921 through which the user is capable of being directly entering a text. The user may directly edit parameters via the on-screen keyboard 921. For example, the user may edit "to buy milk and fruit" to "to buy ramen" by directly entering the text.

The user terminal 100 may edit a parameter through a third interface 930. The third interface 930 may include a calendar in which the user selects a date. The user may select the date included in the calendar to edit the parameter. For example, the user may select "February 14" to edit "today" to "February 14".

The user terminal 100 may edit a parameter through a fourth interface 940. For example, for the purpose of editing a parameter of "turn on" in the case where a hint is "turn on Wi-Fi", the user terminal 100 may output a bar 941 capable of controlling On/Off of a wireless communication circuit, through the fourth interface 940.

Figure 10:
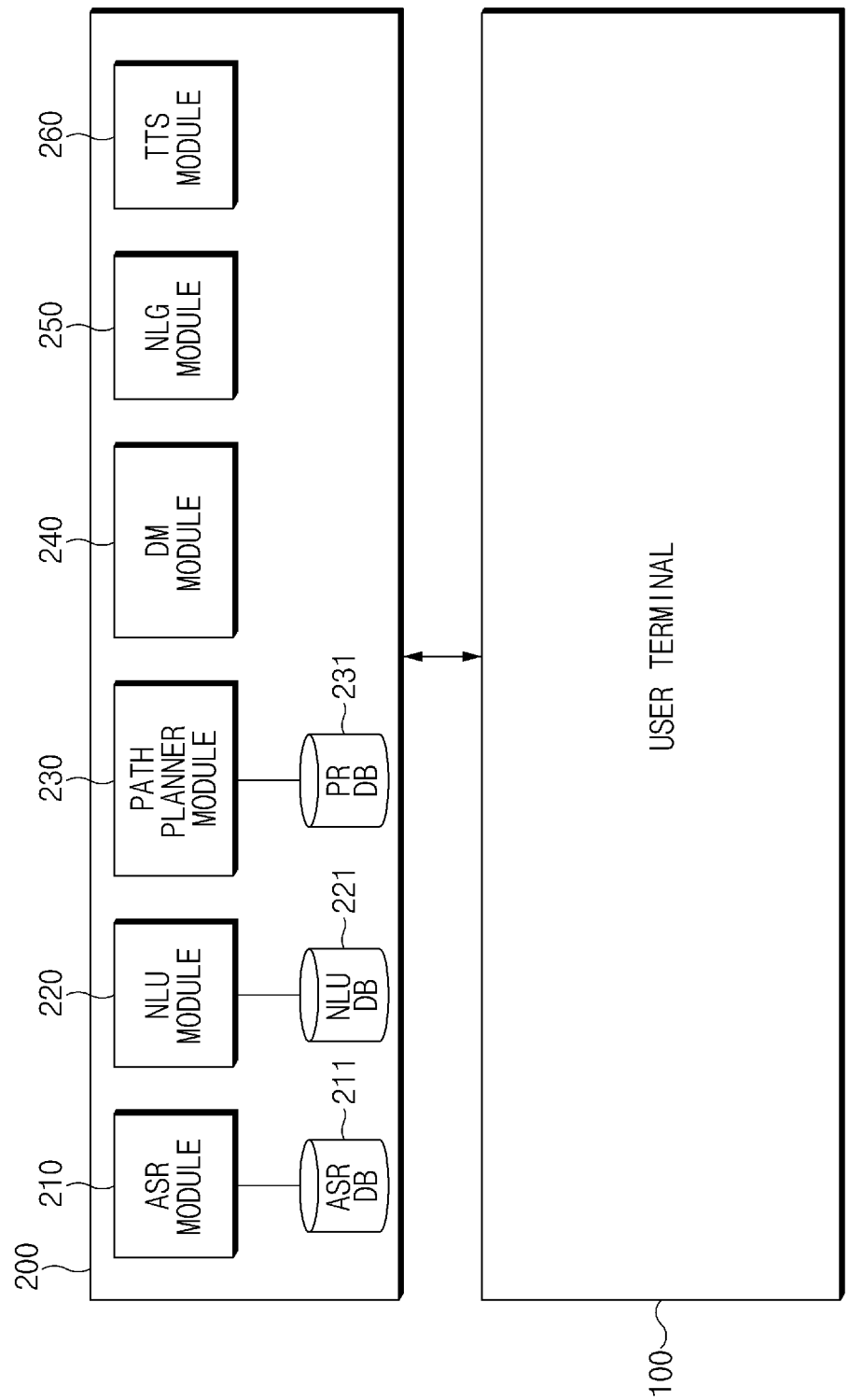
FIG. 10 is a block diagram illustrating an intelligence server of an integrated intelligent system, according to an embodiment of the present disclosure.

FIG. 10 is a block diagram illustrating an intelligence server of an integrated intelligent system, according to an embodiment of the present disclosure.

Referring to FIG. 10, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligence server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule.

According to an embodiment, the ASR module 210 may convert the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech to text data by using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary to express the intent from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 11:
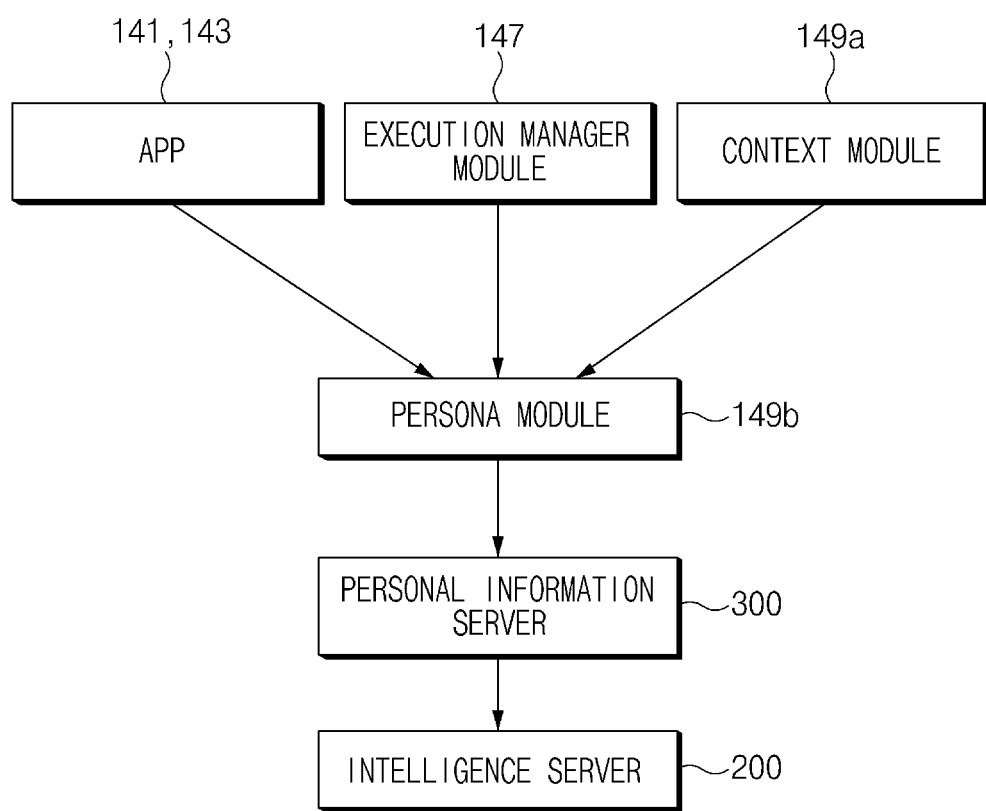
FIG. 11 is a diagram illustrating that a persona module of an intelligence service module manages information of a user, according to an embodiment of the present disclosure.

FIG. 11 is a diagram illustrating that a persona module of an intelligence service module manages information of a user, according to an embodiment of the present disclosure.

Referring to FIG. 11, the processor 150 may receive information of the user terminal 100 from the apps 141 and 143, the execution manager module 147, or the context module 149a through the persona module 149b. The processor 150 may store information about the result obtained by executing the actions 141b and 143b of an app in an action log database through the apps 141 and 143 and the execution manager module 147. The processor 150 may store information about a current state of the user terminal 100 in a context database through the context module 149a.

The processor 150 may receive the stored information from the action log database or the context database through the persona module 149b. For example, data stored in the action log database and the context database may be analyzed by an analysis engine and may be transmitted to the persona module 149b.

According to an embodiment, the processor 150 may transmit information received from the apps 141 and 143, the execution manager module 147, or the context module 149a to the executed suggestion module 149c through the persona module 149b. For example, the processor 150 may transmit the data stored in the action log database or the context database to the suggestion module 149c through the persona module 149b.

According to an embodiment, the processor 150 may transmit information received from the apps 141 and 143, the execution manager module 147, or the context module 149a to the personal information server 300 through the persona module 149b. For example, the processor 150 may periodically transmit the data, which is accumulated and stored in the action log database or the context database, to the personal information server 300 through the persona module 149b.

According to an embodiment, the processor 150 may transmit the data stored in the action log database or the context database to the executed suggestion module 149c through the persona module 149b. The user information generated through the persona module 149b may be stored in a persona database. The persona module 149b may periodically transmit the user information stored in the persona database to the personal information server 300. According to an embodiment, the information transmitted to the personal information server 300 through the persona module 149b may be stored in the persona database. The personal information server 300 may infer user information necessary to generate a path rule of the intelligence server 200 by using the information stored in the persona database.

According to an embodiment, the user information inferred by using the information transmitted through the persona module 149b may include profile information or preference information. The profile information or the preference information may be inferred through an account of the user and accumulated information.

The profile information may include personal information of the user. For example, the profile information may include demographic information of the user. For example, the demographic information may include gender, age, or the like of the user. For another example, the profile information may include life event information. For example, the life event information may be inferred by comparing log information with a life event model and may be reinforced by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be inferred by using the activity area information (e.g., information about a house and a workplace). The information about the sleep time may be inferred through an unused time of the user terminal 100.

The preference information may include preference information of the user. For example, the preference information may include information about app preference. For example, the app preference may be inferred through a usage log (e.g., a time- and place-specific usage log) of an app. The app preference may be used to determine an app to be executed depending on a current state (e.g., time or place) of the user. For another example, the preference information may include information about contact preference. For example, the contact preference may be inferred by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be inferred by analyzing information about setting frequency (e.g., a time- and place-specific frequency of setting a setting value) of a specific setting value. The setting information may be used to set a specific setting value depending on the current state (e.g., a time, a place, or a situation) of the user. For another example, the preference information may include place preference. For example, the place preference may be inferred through visit history (e.g., a time-specific visit history) of a specific place. The place preference may be used to determine a place to visit depending on the current state (e.g., time) of the user. For another example, the preference information may include instruction preference. For example, the instruction preference may be inferred through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 12:
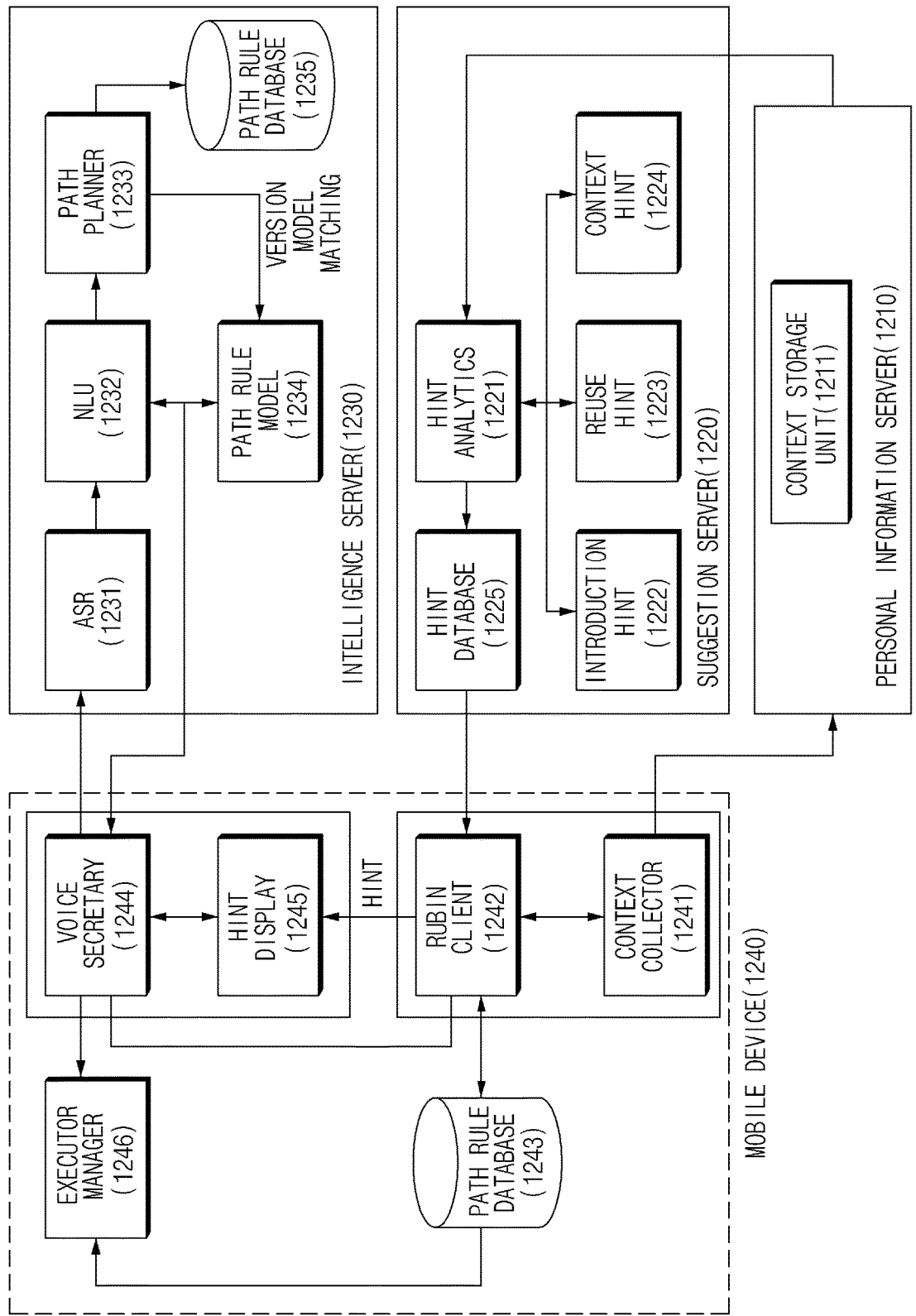
FIG. 12 illustrates an integrated intelligent system, according to another embodiment of the present disclosure.

FIG. 12 illustrates an integrated intelligent system, according to another embodiment of the present disclosure.

Referring to FIG. 12, according to an embodiment of the present disclosure, a personal information server 1210 may receive a user context from a user terminal 1240. For example, the personal information server 1210 may receive, from the user terminal 1240, the number of times that a specific application is executed, a log-in record, a website frequently visited by a user, and the like. A context storage unit 1211 may store the received user context.

According to an embodiment of the present disclosure, a suggestion server 1220 may include a hint analytics module 1221, an introduction hint module 1222, a reuse hint module 1223, a context hint module 1224, or a hint database 1225.

According to an embodiment of the present disclosure, the hint analytics module 1221 may receive and analyze the user context from the personal information server 1210. The introduction hint module 1222, the reuse hint module 1223, and the context hint module 1224 may generate hints based on the analyzed user context. For example, the introduction hint module 1222 may generate hints associated with tasks that the user has not performed. The reuse hint module 1223 may generate the hints associated with tasks frequently performed by the user. The context hint module 1224 may generate the hints based on the order of the user context.

According to an embodiment of the present disclosure, the hint database 1225 may store the hints generated by the introduction hint module 1222, the reuse hint module 1223, and the context hint module 1224. The hints stored in the hint database 1225 may be transmitted to a rubin client 1242 of the user terminal 1240.

According to an embodiment, the suggestion server 1220 may transmit a hint and a path rule paired with the hint, to the user terminal 1240. The hint and the paired path rule may be implemented with a path rule corresponding to the version of the application to be controlled in the hint. For another example, after verifying the version of the application installed in the user terminal 1240, the suggestion server 1220 may pair the path rule corresponding to the version with the hint to transmit the paired result to the user terminal 1240.

According to an embodiment, the suggestion server 1220 may classify hints into hints, which the user terminal 1240 performs in an offline, and hints, which the user terminal 1240 performs in an online to transmit the classified result to the user terminal 1240. In addition, the suggestion server 1220 may transmit hints, which allows the user terminal 1240 to enter the online from the offline, to the user terminal 1240.

According to an embodiment of the present disclosure, an intelligence server 1230 may include an ASR module 1231, a NLU module 1232, a path planner module 1233, a path rule model 1234, or a path rule database 1235.

According to an embodiment of the present disclosure, the ASR module 1231 may convert the user input received from the user terminal 1240 to text data. The NLU module 1232 may generate a path rule based on the text data converted by the ASR module 1231.

According to an embodiment of the present disclosure, the path planner module 1233 may select at least one path rule among a plurality of path rule generated by the NLU module 1232. The path rule database 1235 may store the path rule generated by the NLU module 1232 and/or the path rule selected by the path planner module 1233.

According to an embodiment of the present disclosure, the path rule model 1234 may refine a path rule based on the version of an application installed in the user terminal 1240. For example, the intelligence server 1230 may periodically receive the version of an application from the user terminal 1240. The path rule model 1234 may refine the path rule based on the version, and the refined path rule may be transmitted to the user terminal 1240.

According to an embodiment of the present disclosure, the user terminal 1240 may include a context collector module 1241, the rubin client 1242, a path rule database 1243, a voice secretary module 1244, a hint display module 1245, or an executor manager 1246.

According to an embodiment of the present disclosure, the context collector module 1241 may transmit user context to the personal information server 1210. For example, the context collector module 1241 may transmit, to the personal information server 1210, the number of times that a specific application is executed, a log-in record, a website frequently visited by a user, and the like.

According to an embodiment of the present disclosure, the rubin client 1242 may receive hints and/or path rules, which are generated by the suggestion server 1220. The path rule database 1243 may store hints and/or path rules, which are received by the suggestion server 1220. The path rule database 1243 may store a path rule received by the intelligence server 1230.

According to an embodiment of the present disclosure, the voice secretary module 1244 may determine whether the user terminal 1240 enters an offline state. For example, in the case where a fault occurs in the wireless communication circuit included in the user terminal 1240 or in the case where a fault occurs in an external server, the voice secretary module 1244 may determine that the user terminal 1240 enters the offline state. For example, the offline state may mean a state where the user terminal 100 is not capable of communicating with an external server (e.g., the intelligence server 1230, the personal information server 1210, or the suggestion server 1220).

According to an embodiment of the present disclosure, when the user terminal 1240 enters the offline state, the hint display module 1245 may output at least one hint among hints stored in the path rule database 1243.

According to an embodiment of the present disclosure, the executor manager 1246 may perform a path rule corresponding to the selected hint in response to a user input to select one of the output hints. For example, when a hint saying that "show me today's schedule" is selected, the executor manager 1246 may execute a schedule application to output the today's schedule.

According to an embodiment of the present disclosure, an electronic device may include a housing, a touch screen display exposed through a first area of the housing, a microphone exposed through a second area of the housing, a wireless communication circuit, a processor electrically connected to the touch screen display, the microphone, and the wireless communication circuit, and a memory electrically connected to the processor and storing instructions. In a first state where the wireless communication circuit is capable of communicating with an external server, the instructions, when executed, may cause the processor to launch a voice secretary application, to transmit a user utterance obtained through the microphone, to the external server through the wireless communication circuit, to receive a first task corresponding to the user utterance from the external server, to perform the first task by using at least one application, and, when the wireless communication circuit enters a second state where the communication with the external server is impossible, from the first state, to output at least one or more hints in the touch screen display, to obtain a first user input to select a first hint among the at least one or more hints, and to perform a second task corresponding to the first hint in response to the first user input.

According to an embodiment of the present disclosure, when the wireless communication circuit enters the second state, the instructions may cause the processor to output a notification indicating that obtaining the user utterance is impossible through the microphone, through the touch screen display.

According to an embodiment of the present disclosure, the instructions may cause the processor to output a notification indicating whether the wireless communication circuit enters the second state from the first state, through the touch screen display.

According to an embodiment of the present disclosure, the instructions may cause the processor to output hints, which are capable of being performed in the second state, from among the at least one or more hints.

According to an embodiment of the present disclosure, the instructions may cause the processor to output hints, which allow the wireless communication circuit to enter the first state from the second state, among the at least one or more hints.

According to an embodiment of the present disclosure, the instructions may cause the processor to output hints, which are capable of being performed in the first state, from among the at least one or more hints.

According to an embodiment of the present disclosure, when the wireless communication circuit enters the first state from the second state, the instructions may cause the processor to perform a third task corresponding to the second hint in response to a second user input to select a second hint among the hints capable of being performed in the first state.

According to an embodiment of the present disclosure, the instructions may cause the processor to output hints, which correspond to applications being executed in the electronic device, from among the at least one or more hints.

According to an embodiment of the present disclosure, the instructions may cause the processor to output hints, which correspond to user context being data obtained through the electronic device for a specified period of time, from among the at least one or more hints.

According to an embodiment of the present disclosure, the instructions may cause the processor to output hints, which correspond to versions of applications being executed in the electronic device, from among the at least one or more hints.

According to an embodiment of the present disclosure, the instructions may cause the processor to select a sequence of states of the electronic device corresponding to the first hint and perform the second task based on the selected sequence.

According to an embodiment of the present disclosure, the instructions may cause the processor to output hints associated with the user utterance in the first state where the wireless communication circuit is capable of communicating with the external server.

According to an embodiment of the present disclosure, the instructions may cause the processor to classify parameters included in the first hint into a first type parameter, which is editable by the user, and a second type parameter, which is not editable by the user.

According to an embodiment of the present disclosure, the instructions may cause the processor to provide a user interface capable of editing the first type parameter.

According to an embodiment of the present disclosure, the instructions may cause the processor to obtain a second user input for editing the first type parameter, to edit the first type parameter based on the second user input, and to output a hint, which is generated by merging the edited first type parameter and the second type parameter, through the touch screen display.

According to an embodiment of the present disclosure, a computer-readable recording medium may store instructions, when executed by an electronic device, causing the electronic device, in a first state where the wireless communication circuit is capable of communicating with an external server, to launch a voice secretary application, to transmit a user utterance obtained through the electronic device, to the external server, to receive a first task corresponding to the user utterance from the external server, to perform the first task by using at least one application, and, when the wireless communication circuit enters a second state where the communication with the external server is impossible, from the first state, to output at least one or more hints, to obtain a first user input to select a first hint among the at least one or more hints, and to perform a second task corresponding to the first hint in response to the first user input.

According to an embodiment of the present disclosure, the instructions, when executed by an electronic device, may cause the electronic device to output hints, which are capable of being performed in the second state, from among the at least one or more hints.

According to an embodiment of the present disclosure, the instructions, when executed by an electronic device, may cause the electronic device to classify parameters included in the first hint into a first type parameter, which is editable by the user, and a second type parameter, which is not editable by the user.

According to an embodiment of the present disclosure, the instructions, when executed by an electronic device, may cause the electronic device to provide a user interface capable of editing the first type parameter.

According to an embodiment of the present disclosure, an electronic device may include a touch screen display, a microphone obtaining a user utterance, a wireless communication circuit communicating with an external server, a memory transmitting the user utterance to the external server through the wireless communication circuit, receiving a first task corresponding to the user utterance from the external server, and storing a voice secretary application performing the received first task, in a first state where the wireless communication circuit is capable of communicating with the external server and a processor electrically connected to the touch screen display, the microphone, the wireless communication circuit, and the memory. When the wireless communication circuit enters a second state, where the communication with the external server is impossible, from the first state, the processor may be configured to launch the voice secretary application, to output at least one or more hints in the touch screen display, to obtain a first user input to select a first hint among the at least one or more hints, and to perform a second task corresponding to the first hint in response to the first user input.

According to an embodiment of the present disclosure, an electronic device may include a housing, a touch screen display exposed through a first area of the housing and disposed inside the housing, a microphone exposed through a second area of the housing and disposed inside the housing, at least one speaker exposed through a third area of the housing and disposed inside the housing, a wireless communication circuit disposed inside the housing, a processor electrically connected to the touch screen display, the microphone, the speaker, and the wireless communication circuit and disposed inside the housing, and a memory electrically connected to the processor and disposed inside the housing. The memory may be configured to store a plurality of application programs installed in the electronic device, and the memory may store instructions that, when executed, are configured to cause the processor to receive a first user input for calling an intelligent assistance service, through the touch screen display or the microphone, to determine whether the electronic device is communicating with an external server providing at least part of one operation of the intelligent assistance service, and, when the electronic device does not communicate with the external server, to provide at least one task, which is executable without the external server, through the touch screen display or the at least one speaker, to receive a second user input to select one of the at least one task, to select a sequence of states of the electronic device for performing the selected task, and to perform the selected task by causing the electronic device to have the sequence of the states.

According to an embodiment of the present disclosure, the instructions, when executed, may cause the processor to verify a state of the electronic device after receiving the first user input and to determine the at least one task based on at least part of the state of the electronic device.

According to an embodiment of the present disclosure, the at least one task may be provided in a form of a natural language utterance for requesting the selected task.

According to an embodiment of the present disclosure, the instructions, when executed, may cause the processor to receive the at least one task from the external server, while the electronic device communicates with the external server.

Figure 13:
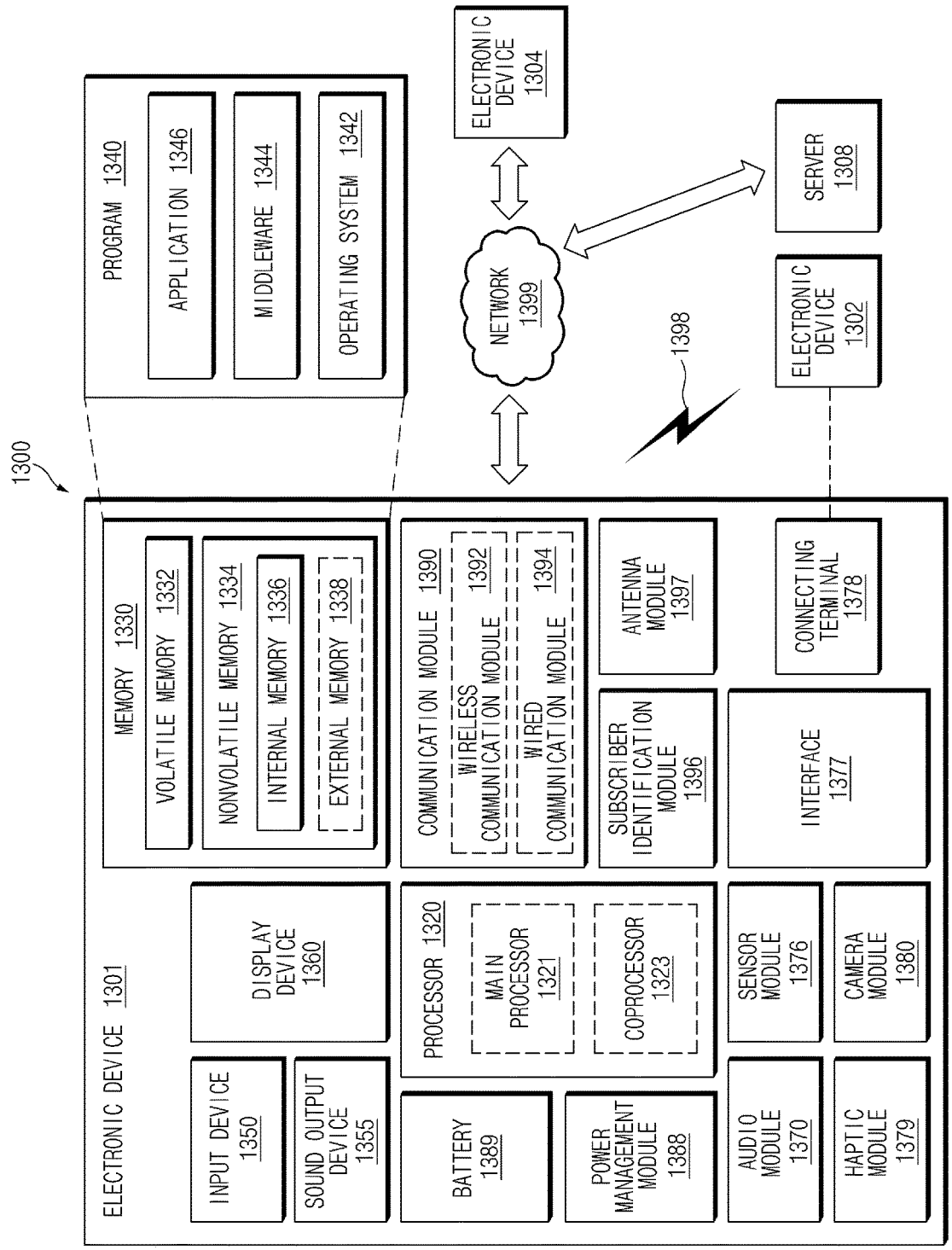
FIG. 13 is a block diagram of an electronic device in a network environment, according to various example embodiments.

FIG. 13 is a block diagram of an electronic device in a network environment according to various example embodiments.

Referring to FIG. 13, the electronic device 1301 (e.g., the user terminal 100 of FIG. 1) may communicate with an electronic device 1302 through a first network 1398 (e.g., a short-range wireless communication) or may communicate with an electronic device 1304 or a server 1308 through a second network 1399 (e.g., a long-distance wireless communication) in the network environment 1300. According to an embodiment, the electronic device 1301 may communicate with the electronic device 1304 through the server 1308. According to an embodiment, the electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module 1396, and an antenna module 1397. According to some embodiments, at least one (e.g., the display device 1360 or the camera module 1380) among components of the electronic device 1301 may be omitted or other components may be added to the electronic device 1301. According to some embodiments, some components may be integrated and implemented as in the case of the sensor module 1376 (e.g., a fingerprint sensor, an iris sensor, or an illuminance sensor) embedded in the display device 1360 (e.g., a display). Any "module" described herein may include circuitry for performing the function of that module.

The processor 1320 may operate, for example, software (e.g., a program 1340) to control at least one of other components (e.g., a hardware or software element) of the electronic device 1301 connected to the processor 1320 and may process and compute a variety of data. The processor 1320 may load a command set or data, which is received from other components (e.g., the sensor module 1376 or the communication module 1390), into a volatile memory 1332, may process the loaded command or data, and may store result data into a nonvolatile memory 1334. According to an embodiment, the processor 1320 may include a main processor 1321 (e.g., a central processing unit or an application processor) and an coprocessor 1323 (e.g., a graphic processing device, an image signal processor, a sensor hub processor, or a communication processor), which operates independently from the main processor 1321, additionally or alternatively uses less power than the main processor 1321, or is specified to a designated function. In this case, the coprocessor 1323 may operate separately from the main processor 1321 or embedded.

In this case, the coprocessor 1323 may control, for example, at least some of functions or states associated with at least one component (e.g., the display device 1360, the sensor module 1376, or the communication module 1390) among the components of the electronic device 1301 instead of the main processor 1321 while the main processor 1321 is in an inactive (e.g., sleep) state or together with the main processor 1321 while the main processor 1321 is in an active (e.g., an application execution) state. According to an embodiment, the coprocessor 1323 (e.g., the image signal processor or the communication processor) may be implemented as a part of another component (e.g., the camera module 1380 or the communication module 1390) that is functionally related to the coprocessor 1323. The memory 1330 may store a variety of data used by at least one component (e.g., the processor 1320 or the sensor module 1376) of the electronic device 1301, for example, software (e.g., the program 1340) and input data or output data with respect to commands associated with the software. The memory 1330 may include the volatile memory 1332 or the nonvolatile memory 1334.

The program 1340 may be stored in the memory 1330 as software and may include, for example, an operating system 1342, a middleware 1344, or an application 1346.

The input device 1350 may be a device for receiving a command or data, which is used for a component (e.g., the processor 1320) of the electronic device 1301, from an outside (e.g., a user) of the electronic device 1301 and may include, for example, a microphone, a mouse, or a keyboard.

The sound output device 1355 may be a device for outputting a sound signal to the outside of the electronic device 1301 and may include, for example, a speaker used for general purposes, such as multimedia play or recordings play, and a receiver used only for receiving calls. According to an embodiment, the receiver and the speaker may be either integrally or separately implemented.

The display device 1360 may be a device for visually presenting information to the user and may include, for example, a display, a hologram device, or a projector and a control circuit for controlling a corresponding device. According to an embodiment, the display device 1360 may include a touch circuitry or a pressure sensor for measuring an intensity of pressure on the touch.

The audio module 1370 may convert a sound and an electrical signal in dual directions. According to an embodiment, the audio module 1370 may obtain the sound through the input device 1350 or may output the sound through an external electronic device (e.g., the electronic device 1302 (e.g., a speaker or a headphone)) wired or wirelessly connected to the sound output device 1355 or the electronic device 1301.

The sensor module 1376 may generate an electrical signal or a data value corresponding to an operating state (e.g., power or temperature) inside or an environmental state outside the electronic device 1301. The sensor module 1376 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1377 may support a designated protocol wired or wirelessly connected to the external electronic device (e.g., the electronic device 1302). According to an embodiment, the interface 1377 may include, for example, an HDMI (high-definition multimedia interface), a USB (universal serial bus) interface, an SD card interface, or an audio interface.

A connection terminal 1378 may include a connector that physically connects the electronic device 1301 to the external electronic device (e.g., the electronic device 1302), for example, an HDMI connector, a USB connector, an SD card connector, or an audio connector (e.g., a headphone connector).

The haptic module 1379 may convert an electrical signal to a mechanical stimulation (e.g., vibration or movement) or an electrical stimulation perceived by the user through tactile or kinesthetic sensations. The haptic module 1379 may include, for example, a motor, a piezoelectric device, or an electric stimulator.

The camera module 1380 may shoot a still image or a video image. According to an embodiment, the camera module 1380 may include, for example, at least one lens, an image sensor, an image signal processor, or a flash.

The power management module 1388 may be a module for managing power supplied to the electronic device 1301 and may serve as at least a part of a power management integrated circuit (PMIC).

The battery 1389 may be a device for supplying power to at least one component of the electronic device 1301 and may include, for example, a non-rechargeable (primary) battery, a rechargeable (secondary) battery, or a fuel cell.

The communication module 1390 may establish a wired or wireless communication channel between the electronic device 1301 and the external electronic device (e.g., the electronic device 1302, the electronic device 1304, or the server 1308) and support communication execution through the established communication channel. The communication module 1390 may include at least one communication processor operating independently from the processor 1320 (e.g., the application processor) and supporting the wired communication or the wireless communication. According to an embodiment, the communication module 1390 may include a wireless communication module 1392 (e.g., a cellular communication module, a short-range wireless communication module, or a GNSS (global navigation satellite system) communication module) or a wired communication module 1394 (e.g., an LAN (local area network) communication module or a power line communication module) and may communicate with the external electronic device using a corresponding communication module among them through the first network 1398 (e.g., the short-range communication network such as a Bluetooth, a WiFi direct, or an IrDA (infrared data association)) or the second network 1399 (e.g., the long-distance wireless communication network such as a cellular network, an internet, or a computer network (e.g., LAN or WAN)). The above-mentioned various communication modules 1390 may be implemented into one chip or into separate chips, respectively.

According to an embodiment, the wireless communication module 1392 may identify and authenticate the electronic device 1301 using user information stored in the subscriber identification module 1396 in the communication network.

The antenna module 1397 may include one or more antennas to transmit or receive the signal or power to or from an external source. According to an embodiment, the communication module 1390 (e.g., the wireless communication module 1392) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1301 and the external electronic device 1304 through the server 1308 connected to the second network 1399. Each of the electronic devices 1302 and 1304 may be the same or different types as or from the electronic device 1301. According to an embodiment, all or some of the operations performed by the electronic device 1301 may be performed by another electronic device or a plurality of external electronic devices. When the electronic device 1301 performs some functions or services automatically or by request, the electronic device 1301 may request the external electronic device to perform at least some of the functions related to the functions or services, in addition to or instead of performing the functions or services by itself. The external electronic device receiving the request may carry out the requested function or the additional function and transmit the result to the electronic device 1301. The electronic device 1301 may provide the requested functions or services based on the received result as is or after additionally processing the received result. To this end, for example, a cloud computing, distributed computing, or client-server computing technology may be used.

The electronic device according to various example embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various example embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing an element from the other elements. It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposed between them.

The term "module" used herein may represent, for example, a unit including one or more combinations of hardware, software and firmware. The term "module" may be interchangeably used with the terms "logic", "logical block", "component" and "circuit". The "module" may be a minimum unit of an integrated component or may be a part thereof. The "module" may be a minimum unit for performing one or more functions or a part thereof. For example, the "module" may include an application-specific integrated circuit (ASIC).

Various example embodiments of the present disclosure may be implemented by software (e.g., the program 1340) including an instruction stored in a machine-readable storage media (e.g., an internal memory 1336 or an external memory 1338) readable by a machine (e.g., a computer). The machine may be a device that calls the instruction from the machine-readable storage media and operates depending on the called instruction and may include the electronic device (e.g., the electronic device 1301). When the instruction is executed by the processor (e.g., the processor 1320), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various example embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various example embodiments may include at least one of the above elements, and a portion of the above sub-components may be omitted, or additional other sub-components may be further included. Alternatively or additionally, some components (e.g., the module or the program) may be integrated in one element and may perform the same or similar functions performed by each corresponding components prior to the integration. Operations performed by a module, a programming, or other components according to various example embodiments of the present disclosure may be executed sequentially, in parallel, repeatedly, or in a heuristic method. Also, at least some operations may be executed in different sequences, omitted, or other operations may be added.

While the present disclosure has been shown and described with reference to various example embodiments thereof, it will be understood by those skilled in the art that various changes in form and details may be made therein without departing from the spirit and scope of the present disclosure as defined by the appended claims and their equivalents.

What is claimed is:
1. An electronic device comprising:
 a housing;
 a touch screen display exposed through a first area of the housing;
 a microphone exposed through a second area of the housing;
 a wireless communication circuit;
 a processor electrically connected to the touch screen display, the microphone, and the wireless communication circuit; and
 a memory electrically connected to the processor and configured to store instructions, wherein the instructions are configured when executed to cause the processor to, when the wireless communication circuit is in a first state where the wireless communication circuit is configured to communicate with an external server in an online state:

launch a voice secretary application;

transmit a user utterance obtained through the microphone, to the external server through the wireless communication circuit;

receive a first task corresponding to the user utterance from the external server;

cause the first task to be performed via at least one application; and wherein the instructions are further configured when executed to cause the processor to, when the wireless communication circuit is in a second state where the wireless communication circuit is impossible to communicate with the external server in an offline state, entered from the first state to the second state:

cause a plurality of hints to be output, which correspond to a plurality of tasks executable in the offline state, via the touch screen display, receive a first user input to select a first hint among the plurality of hints and a second user input to select a second hint among the plurality of hints, wherein at least one of the first hint and the second hint includes a first type parameter which is editable by a user and a second type parameter which is not editable by the user, display a user interface configured to edit the first type parameter through the touch screen display in response to the first user input, and perform a second task corresponding to the selected first hint and a third task corresponding to the selected second hint, by splitting the touch screen display visually, output an execution screen of the second task and an execution screen of the third task to the split touch screen display simultaneously in the second state.

2. The electronic device of claim 1, wherein, when the wireless communication circuit enters the second state, the instructions are configured to cause the processor to:

cause an output of a notification indicating that obtaining of the user utterance is impossible through the microphone, through the touch screen display.

3. The electronic device of claim 1, wherein the instructions are configured to cause the processor to:

cause an output of a notification indicating whether the wireless communication circuit enters the second state from the first state, through the touch screen display.

4. The electronic device of claim 1, wherein the instructions are configured to cause the processor to:

cause hints to be output, which hints are capable of being performed in the second state, from among the plurality of hints.

5. The electronic device of claim 1, wherein the instructions are configured to cause the processor to:

cause hints to be output, which allow the wireless communication circuit to enter the first state from the second state, among the plurality of hints.

6. The electronic device of claim 1, wherein the instructions are configured to cause the processor to:

cause hints to be output, which are capable of being performed in the first state, from among the plurality of hints.

7. The electronic device of claim 6, wherein, when the wireless communication circuit has entered the first state from the second state, the instructions are configured to cause the processor to:

in response to a third user input to select a third hint among the hints capable of being performed in the first state, perform a fourth task corresponding to the third hint.

8. The electronic device of claim 1, wherein the instructions are configured to cause the processor to:

cause hints to be output, which correspond to applications configured to be executed in the electronic device, from among the plurality of hints.

9. The electronic device of claim 1, wherein the instructions are configured to cause the processor to:

cause hints to be output, which correspond to user context data obtained through the electronic device for a specified period of time, from among the plurality of hints.

10. The electronic device of claim 1, wherein the instructions are configured to cause the processor to:

cause hints to be output, which correspond to versions of applications configured to be executed in the electronic device, from among the plurality of hints.

11. The electronic device of claim 1, wherein the instructions are configured to cause the processor to:

select a sequence of states of the electronic device corresponding to the first hint; and perform the second task based on the selected sequence.

12. The electronic device of claim 1, wherein the instructions are configured to cause the processor to:

cause hints to be output, the hints associated with the user utterance in the first state where the wireless communication circuit is configured to communicate with the external server.

13. The electronic device of claim 1, wherein the user interface includes at least one of on-screen keyboard or a parameter list including a plurality of parameters which is stored in the memory.

14. The electronic device of claim 1, wherein the instructions are configured to cause the processor to:

receive a fourth user input for editing the first type parameter;

edit the first type parameter based on the fourth user input; and output a hint, which is generated by merging the edited first type parameter and the second type parameter, through the touch screen display.

* * * * *